July 8, 1947.                M. N. FAIRBANK                2,423,491
                          OPTICAL LENS MOUNTING
                     Filed July 14, 1943        2 Sheets—Sheet 1

Murry N. Fairbank
INVENTOR.

BY Donald L. Brown
Attorney

July 8, 1947.   M. N. FAIRBANK   2,423,491
OPTICAL LENS MOUNTING
Filed July 14, 1943   2 Sheets-Sheet 2

INVENTOR.
Murry N. Fairbank
BY Donald L. Brown
Attorney

Patented July 8, 1947

2,423,491

UNITED STATES PATENT OFFICE 2,423,491

OPTICAL LENS MOUNTING

Murry N. Fairbank, Weston, Mass., assignor to Polaroid Corporation, Cambridge, Mass., a corporation of Delaware Application July 14, 1943, Serial No. 494,682

14 Claims. (Cl. 88—57)

This invention relates to optical apparatus and more particularly to means for mounting the lens elements of an optical system.

It is one object of the present invention to provide a novel mounting for one or more lens elements of plastic whereby the latter may be contained in a housing, for example of metal or of a resin having a substantially different coefficient of thermal expansion from that of said plastic, without being distorted or decentered with changes in temperature.

Another object is to provide a novel means for mounting a plastic lens system in a housing having a high heat conductivity whereby the lenses are thermally insulated from said housing and are not subjected to the rapid temperature changes which the housing may undergo.

A further object is to provide means for mounting a lens in a housing to fix the axial position thereof relative to said housing while permitting substantially unrestricted axial expansion and contraction of said lens.

Still another object is to provide a novel mounting whereby a lens element, for example of plastic, may be rigidly secured in a sleeve member of a material having substantially the same coefficient of thermal expansion as said lens.

A still further object is to provide a mounting of the above type wherein the sleeve member is formed of a plastic material and the lens is bonded thereto.

A further object is to provide novel lens mounts which may be readily constructed and assembled and which consist of a relatively few simple parts.

The above and other objects and novel features of this invention will more fully appear from the following detailed description when the same is read in connection with the accompanying drawings. It is to be expressly understood, however, that the drawings are for purposes of illustration only and are not intended as a definition of the limits of the invention, reference being primarily had for this latter purpose to the appended claims.

In the drawings, wherein like reference characters refer to like parts throughout the several views.

Figure 7:
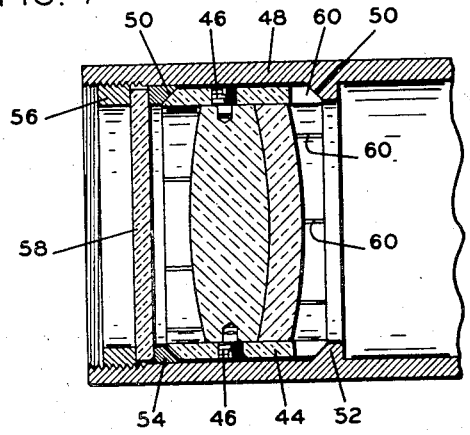
Figure 8:
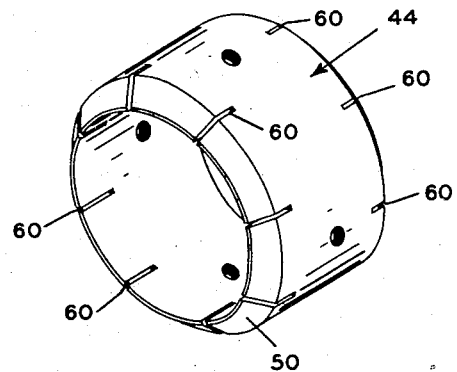
Figure 9:
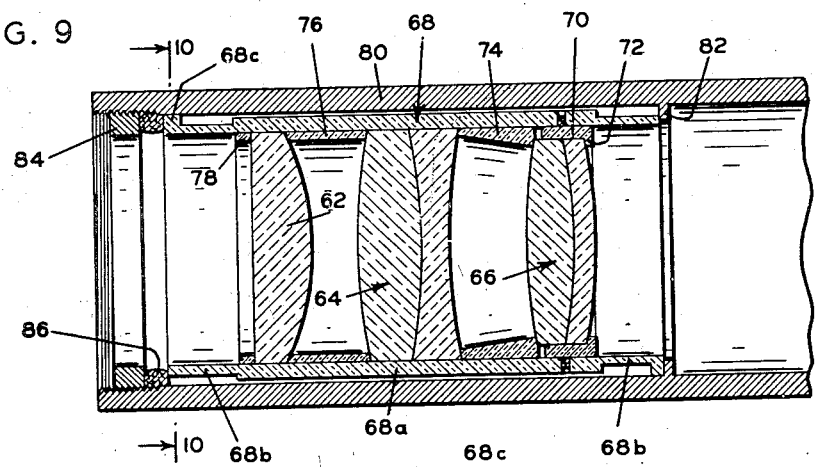
Figure 10:
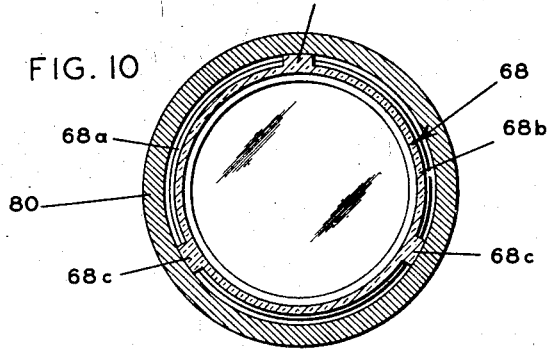

Figs. 3, 4, 5, and 6 are enlarged fragmentary sectional views of different arrangements for mounting a plastic lens in a plastic sleeve;

Fig. 7 is an axial sectional view with parts broken away of an optical device embodying a modified form of the novel mounting of the invention;

Fig. 8 is a perspective view of a sleeve member which is an element of the mounting of Fig. 7;

Fig. 9 is a view similar to Fig. 7 of still another form of lens mounting comprehended by the present invention; and Fig. 10 is a sectional view taken substantially along line 10—10 of Fig. 9.

Figure 1:
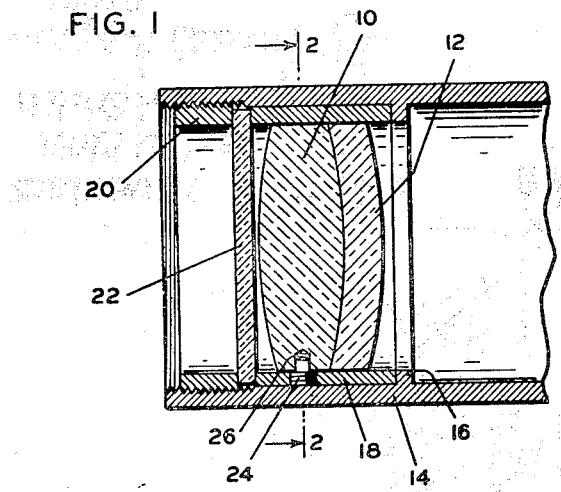
Figure 1 is an axial sectional view, with parts broken away, of an optical apparatus embodying the novel mounting of the present invention.
Figure 2:
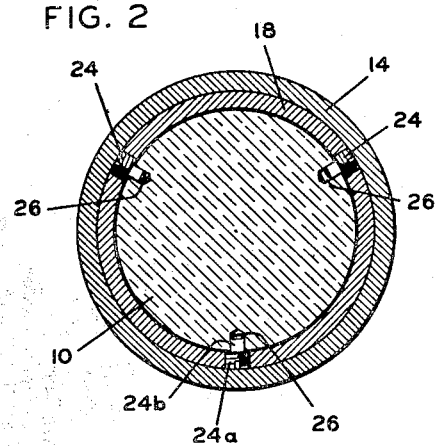
Fig. 2 is a sectional view taken substantially along line 2—2 of Fig. 1.

In Figs. 1 and 2, one form of the novel lens mount embodying the present invention is illustrated as operatively mounting the object lens 10, 12 for example of a telescope, said object lens 10, 12 comprising a cemented doublet and having at least one element thereof formed of an organic resin or plastic. As shown, doublet 10, 12 consists of a positive lens 10, preferably of cyclohexyl methacrylate, and a negative lens 12, preferably of styrene, it being expressly understood, however, that the utility of the novel mount of the invention is in no respect limited to a particular lens material. Lens elements formed of any one of a large number of resins, as for example the polymerizable, transparent, acrylic and methacrylic esters, and the vinyl compounds, such as cyclohexylcyclohexyl methacrylate, methyl methacrylate, alpha phenyl ethyl methacrylate, phenyl methacrylate, benzyl methacrylate, ortho-methyl styrene, ortho-chloro styrene, tetra-hydro-furfuryl methacrylate, and menthyl methacrylate, may be mounted by the novel means of the present invention. Lenses, for example of glass, may also be mounted in accordance with the invention in housings or sleeves having substantially different coefficients of thermal expansion.

In the form illustrated, the housing for the telescope comprises a tubular member 14 which may be metallic and which is preferably provided with an internally-extending flange or shoulder 16. Concentrically mounted in said tubular housing with the inner end thereof bearing against said flange so as to have its axial position predetermined thereby, is a sleeve 18 which carries doublet 10, 12. Sleeve 18 may be formed of an insulating material having a coefficient of thermal expansion approximately equal to that of elements 10, 12, as for example of any of the aforenamed resins, or it may be formed of a material, such as phenolic resin, having a substantially different coefficient of thermal expansion. A screw ring 20, internally threaded in the outer end of housing 14, fixes sleeve 18 against axial movement and a window 22 for protecting lens 10, 12 may be interposed between the inner end of said ring and the outer end of sleeve 18. Where said sleeve is of a material having a substantially different coefficient of thermal expansion from the material of housing 14, it is preferable in order to permit radial expansion of said sleeve relative to said housing to provide a clearance between the periphery of said sleeve and said housing.

In order to fix lens doublet 10, 12 in sleeve 18 in a novel manner whereby axial and radial differential expansion of said lens relative to said sleeve is possible, a plurality of lens mounts or pins 24, three being preferred (Fig. 2), are provided in sleeve 18 and are preferably located in the same transverse plane and spaced at equal distances around the periphery of said sleeve. Each of said pins extends radially inward to project beyond the inner peripheral wall of said sleeve and, in the form shown, comprises a threaded shank 24a for mounting the same in said sleeve, and a cylindrical pilot 24b formed integrally with said shank and adapted to extend into a recess 26 in lens 10, 12. Recesses 26 may be drilled or otherwise provided in one of resinous lens elements 10, 12 as for example in element 10 and are preferably deeper than the length of pilot 24b. Although a screw mounting is preferred, pins 24 may be secured to sleeve 18, as by a press fit, or in any other suitable manner.

In operation, lens 10, 12 is centrally and axially fixed relative to sleeve 18 by elements 24. Sleeve 18 is, in turn, axially secured in a predetermined position by means of screw ring 20, but it is to be noted that the axial force exerted by said ring to hold said sleeve in its axial position is not transmitted to lens 10, 12. Accordingly, although differences in thermal expansion due to changes in temperature may subject sleeve 18 to axial compressive strains, these strains are not transmitted to lens 10, 12, the latter being substantially free for differential expansion and contraction in an axial direction. If sleeve 18 and lens elements 10 and 12 have substantially equal coefficients of thermal expansion, there is substantially no relative radial movement therebetween due to differences in temperature. In the latter case there need be no clearance between said sleeve and the periphery of said lens. However, the pin mounting is also adapted to secure a lens material in a sleeve having a substantially different coefficient of thermal expansion, in which event the lens is formed so that there is a sufficient clearance between its periphery and the inner wall of said sleeve to accommodate any relative radial expansion of said lens relative to said sleeve. The assembly comprising said sleeve and said elements is held against radial expansion and contraction relative to housing 14 only by the frictional engagement between the ends of said sleeve and window 22 and flange 16. As a result, there is no rigid restraint on the radial expansion of said assembly relative to the housing therefor, and lens 10, 12 can expand radially and axially relative to said housing without distortion.

Sleeve 18 also thermally insulates lens 10, 12 from housing 14, thereby preventing rapid transmission of ambient temperature changes to said lens and avoiding temporary distortions in said lens.

In the above described embodiment, when the sleeve and the housing are formed of materials having different coefficients of thermal expansion so that there is a clearance between the sleeve and the housing, the sleeve may become decentered relative to the housing with changes in temperature. This is undesirable in lens systems of high accuracy and may introduce an appreciable distortion in lens systems having lenses of relatively large diameter. However, in mountings for lenses of small diameter, the relative radial movement between the sleeve and the housing is comparatively slight and, accordingly, the clearance can be such that there will be no appreciable decentering of the sleeve relative to the housing. This form of mounting may also be used for lens systems, such as low-power binocular systems, where slight decenterization of the lens relative to the housing will not have an appreciable effect on the operation of the lens system.

It is, however, preferable wherever possible, to employ the above mounting in optical devices wherein the housing is of the same material as the sleeve or is of a material having the same coefficient of thermal expansion as the sleeve so that no clearance between housing and sleeve need be provided. In the latter event, provision for the expansion of the lens relative to the housing is made by having a sufficient clearance between the lenses and the sleeve. The radial pin mounting for the lens is such that radial expansion of the lens relative to the sleeve will not vitiate the central location of the lens in the sleeve.

Figure 3:
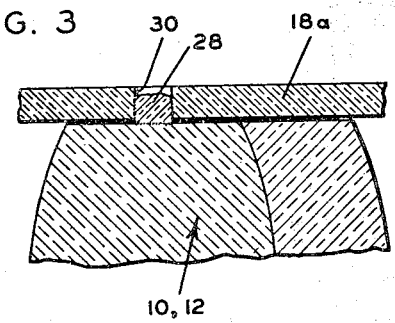

The approximation of a co-planar multi-point support for lens 10, 12 obtained by means of the above pin mounting, may be substantially duplicated by bonding lens 10, 12 to a sleeve 18a at a plurality of co-planar points by means of a plurality of connecting portions 28 (Fig. 3). To obtain this mounting, a plurality of recesses 30, only one being shown, is provided in said sleeve and there is introduced into each said recess a bonding agent of a type adapted to form a bond with said lens and said sleeve when hardened while in contact with the latter elements. The bonding agent is thereafter hardened and upon hardening forms connecting portion 28.

A preferred material for the bonding agent is a polymerizable mass of plastic which is compatible with the plastics of said lens and said sleeve. For lens elements of styrene or cyclohexyl methacrylate and a sleeve of styrene or methyl methacrylate, satisfactory results have been obtained by using polymerizable masses of styrene or methyl methacrylate as the bonding agents. Cyclohexyl methacrylate also gives good results as the bonding agent. It is also possible to use polymers of said plastics in solution as the bonding agents.

In order to confine the bonding agent to a relatively small portion of the peripheral area of said lens and thus approximate a point support, it is preferable that the mass of said agent be in a highly viscous condition when introduced into said recess. The desired viscosity may be readily obtained by controlling the concentration of the polymer in said mass and this may be accomplished by partially polymerizing the monomer to the desired extent or by mixing predetermined quantities of polymer and monomer.

The hardening of the polymerizable bonding agent by polymerization may be accelerated, as for example, by the use of a polymerization catalyst and/or by the application of heat after the introduction of said mass into each of recesses 30. When hardened, said mass provides connecting links 28 which are substantially integral with said lens and said sleeve.

Another type of bonding agent which is suitable for forming connecting portions 28 to secure together lens 10, 12 and sleeve 18a, is a high melting point vinyl compound dissolved in a solvent which has no solvent action on the plastic of said lens or sleeve. For cyclohexyl methacrylate, methyl methacrylate, or styrene, or any combination of these materials, it has been found suitable to employ as bonding agent the vinyl acetate-acetal mixture sold under the trade name "Alvar," the vinyl acetate sold under the trade name "Vinylite X," or the vinyl compound sold as "Mowilith N," and a suitable solvent for each of these is methanol. The viscosity of the mixture can be readily controlled by varying the concentration of the vinyl compound in the solution.

Other types of bonding agents suitable for styrene and cyclohexyl methacrylate are the low melting point thermoplastic cements, such as the low melting point vinyl acetates or non-oxidizing alkyd resins. Examples of the latter types of cements are the vinyl acetate cement "Gelva" and the alkyd resin sold under the trade name "Rezyl 14."

Figure 4:
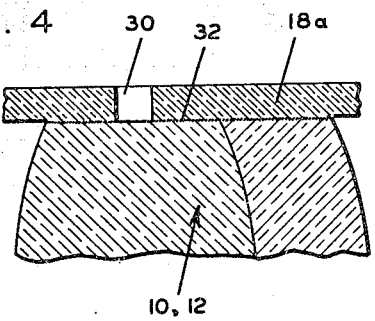

Although the point support type of mounting is preferred, it is adequate in some plastic lens systems, as for example systems comprising lenses of small diameter, to bond the entire peripheral surface of the lens to the sleeve. One embodiment of this type of mounting is illustrated in Fig. 4 with the bond indicated at 32 and may be obtained by introducing into recesses 30 of sleeve 18a a non-viscous bonding agent which is adapted to flow into and substantially fill the entire annular space between said lens and said sleeve. The viscosity of the other above-named cements, such as the high melting point vinyl compounds, may be controlled so as to obtain this effect, as by controlling their concentration in the solvents therefor. It is also possible to utilize as the bonding agent a common solvent for the plastics of the lens and the sleeve, provided the clearance between lens and sleeve is relatively small, as for example, of the order of .001". For styrene, cyclohexyl methacrylate or methyl methacrylate, or any combination of these materials, preferred solvents are ethyl acetate, chloroform and ethylene dichloride. The adjoining surface portions of said lens and sleeve are softened by the solvent when the latter is introduced but as the solvent diffuses through the plastics of said lens and the sleeve, said softened portions harden in substantial contact with one another and form autogenous bond 32.

Figure 5:
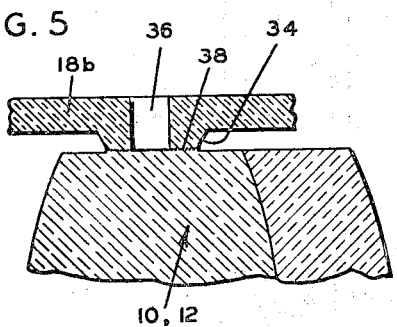

A further modification of the novel mounting is shown in Fig. 5 wherein a substantially continuous annular bond between lens and sleeve is obtained over a fraction of the axial length of the edge of the lens. This mounting is obtained by providing a plastic sleeve 18b with an internally extending flange or boss 34 and having each of recesses 36 in said sleeve connect with the inner face of said flange. By introducing into said recesses a non-viscous bonding agent of the type specified in connection with the mounting shown in Fig. 4, the lens is bonded as at 38 to the face of said flange.

It will be readily appreciated that in all of the above arrangements for bonding the lens element and the mounting sleeve, the percentage peripheral area of the lens which is bonded to the sleeve will depend on the viscosity of the bonding agent, on the number of recesses for introducing the agent and on the spacing and construction of the sleeve and lens so that bonds of a type differing from those illustrated may be readily obtained.

Figure 6:
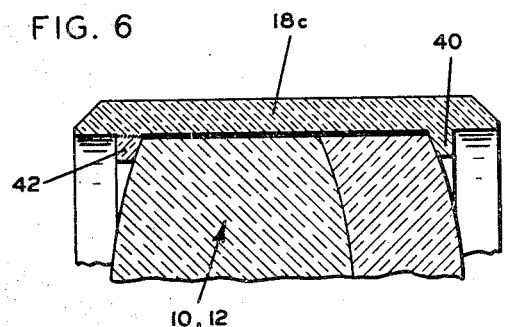

Still another arrangement for mounting lens 10, 12 in a plastic sleeve 18c is illustrated in Fig. 6, said sleeve being provided with an internally extending shoulder or flange 40 against which lens 10, 12 abuts and has its axial position fixed. To hold said lens in engagement with said flange, a ring member 42, preferably of plastic, is bonded or mechanically secured to said sleeve in accordance with any of the above described methods for securing lens 10, 12 in sleeves 18, 18a, and 18b. It is to be understood that the bonding agent may be applied to the periphery of the ring prior to the insertion thereof into said sleeve or may be introduced from the inside of said sleeve between the latter and said ring, rendering the provision of recesses in said sleeve unnecessary.

A modification of the sleeve mounting of Figs. 1 and 2 is shown in Figs. 7 and 8 and comprises a plastic sleeve 44 of novel construction having lens 10, 12 mounted therein in accordance with any of the above described arrangements, as for example, by means of a plurality of pins 46. To retain said sleeve in a cylindrical housing 48, for example of metal or of a phenolic resin, so that the optical axis of lens 10, 12 remains fixed when said sleeve expands relative to said housing with changes in temperature, said sleeve has the end surfaces 50 thereof inclined, as by being provided with a 45° bevel. A flange or shoulder 52 is integrally formed or rigidly secured to said housing and has one face thereof inclined at an angle corresponding to the inclination of one of sleeve surfaces 50, the latter being adapted to abut against said shoulder to predetermine the position of said sleeve. A retaining ring 54 formed, for example, of the same material as housing 48, is mounted to bear against the other end of sleeve 44 and the face thereof which engages said sleeve is also inclined at an angle corresponding to the angle of inclination of the surface 50 it engages. Ring 54 is suitably secured in position as by a locking ring 56 threaded, for example, in the outer end of housing 48 and a glass window 58 may be provided between said locking ring and said retaining ring.

Sleeve 44 is initially mounted in said housing so that at the lowest temperature which is to be encountered during use of the optical system, said sleeve is under a slight compression. This predetermines the position of the optical axis of the lens relative to the housing and at increased temperatures, as sleeve 44 expands, the expansion produces movement of surfaces 50 relative to the inclined faces of ring 54 and flange 52, but because of the inclination of the latter the axis of the expanding sleeve, i. e., the optical axis of the lens, remains fixed.

In order to permit expansion of sleeve 44 relative to housing 48 without introducing strains of considerable magnitude in said sleeve, the latter is provided with a plurality of axial slots 60 in the opposite ends thereof, said slots being equally spaced around the circumference of said sleeve, the slots at one end being preferably staggered relative to the slots at the other end. As sleeve 44 expands, the edge portions thereof will be compressed in a smaller circle but because of the slotted construction this compression will not be transmitted to any appreciable extent to lens 10, 12. Accordingly, radial expansion of said sleeve and said lens with changes in temperature can take place without subjecting said lens to strains and without vitiating the central location of said lens relative to the optical axis of the lens system, of which said lens is an element.

Still another embodiment of the invention is illustrated in Figs. 9 and 10 and comprises sleeve means for operatively mounting an object lens consisting, for example, of three spaced lenses 62, 64, and 66, of which lens 62 is a single element and lenses 64 and 66 are doublets with the rearmost doublet 66 having a diameter smaller than that of either of the other lenses. A novel plastic sleeve member 68 is provided having an internal diameter substantially equal to the diameters of lenses 62 and 64 and to mount rear doublets 66 therein, a ring 70 of plastic having substantially the same coefficient of thermal expansion as that of the lenses and said sleeve, is rigidly secured in said sleeve in accordance with any of the arrangements of Figs. 1 to 5. The inner diameter of said ring is substantially equal to that of lens 66 and there is formed at the rear end of said ring an inwardly extending shoulder or flange 72 which engages said lens when the latter is positioned in said ring. A spacer 74 engages the front end of lens 66 and predetermines the separation between said lens and doublet 64 and the latter is, in turn, separated from the lens 62 by a second spacer 76. To maintain said lenses in engagement with said spacers lens 62 may be cemented to sleeve 68 or a ring 78 may be adhesively or otherwise rigidly secured in sleeve 68 to bear against the front face of lens 62.

Sleeve 68 is constructed in a novel manner so that it may be mounted in a suitable housing 80, of a material having a coefficient of expansion differing substantially from that of said sleeve, without having the lenses mounted therein decentered with changes in temperature and without distorting the latter with said changes. To accomplish this sleeve 68 preferably has the central portion 68a thereof, i. e. the portion wherein lenses 62, 64, and 66 are mounted, of sufficient thickness to be substantially rigid and the outer diameter of said portion is smaller than the inner diameter of said housing so that the latter imposes no restrictions on the outward expansion of said portion. Integrally formed with said rigid portion at opposite ends thereof are portions 68b of reduced thickness, the latter portions being sufficiently thin so that deformations at the outer ends thereof will not be transmitted to any substantial extent to said rigid central portion.

To centrally mount sleeve 68 in housing 80, each of portions 68b of said sleeve is provided at its outer end with a plurality of radially extending fingers or prongs 68c, three being preferred, and said fingers are adapted to engage the inner face of said housing. As a result of this mounting radial expansion of sleeve portion 68a is not constrained to any appreciable extent by the continuous engagement of fingers 68c with the inner face of said housing, but said engagement serves to maintain the axis of portion 68a, and therefore of the lenses mounted therein, fixed relative to the axis of said housing.

Sleeve 68 is preferably fixed in housing 80 for limited axial expansion and, as shown, the axial mounting therefor comprises an internally extending shoulder or flange 82 rigidly secured to, or formed with, said housing against which the inner end of said sleeve is adapted to bear. The latter may be held in engagement with said flange in any suitable manner, as by means of a retaining ring 84 threaded in the outer end of housing 80 and to permit limited axial expansion of said sleeve relative to said housing a resilient gasket or ring 86, for example of cork or rubber, is interposed between the inner end of said retaining ring and the outer end of said sleeve.

It is to be expressly understood that sleeves 18a, 18b, 18c, 44, and 68 in the above-described embodiments are formed of a material having substantially the same coefficient of thermal expansion as the lenses. The spacers and rings contained in said sleeves which come in contact with said lenses are also preferably formed of a material of this type unless they are mechanically secured in said sleeves as by the pin mounting of Fig. 1, in which event they may be of a material of different coefficient and may be mounted for relative radial expansion in said sleeves.

There are thus provided novel means for mounting a lens system comprising lens components of organic resin or plastic, for example in a metallic housing, whereby the effects of temperature changes on the physical dimensions of the lenses introduces substantially no distortion in said lenses. The novel means also serve to insulate the lens system against rapid temperature changes and thereby prevent the introduction of local strains which would deleteriously affect the optical properties of the lens components.

There are also provided novel means for securing lens components of plastic in a sleeve mounting of plastic. In one form of said means a plurality of pins mechanically mount the lens component for free axial expansion and contraction relative to the sleeve, and in other forms of said mounting means the lens element has its entire, or a portion of its, peripheral area substantially integrally connected to said sleeve.

Since certain changes in the constructions set forth which embody the invention may be made without departing from its scope, it is intended that all matter contained in the above description or shown in the accompanying drawings, shall be interpreted as illustrative and not in a limiting sense.

What is claimed is:

1. In a mounting for a lens of plastic, a housing of a material having a coefficient of thermal expansion substantially different from that of said lens, a sleeve of a plastic having a coefficient of thermal expansion of the same order as said lens and within which said lens is mounted, means engaging only the end portions of said sleeve for securing the latter in said housing, the main peripheral area of said sleeve being free of said housing, and means engaged with the sleeves and the lens at intervals around the periphery of the lens for securing the lens in said sleeve.

2. In a mounting for a lens, a housing of a material having a coefficient of thermal expansion substantially different from that of said lens, a member of thermally insulating material having a coefficient of thermal expansion of the same order as said lens, and means engaging only the end portions of said member for securing the latter in said housing, the peripheral area of said member being otherwise free of said housing, and means for fixing said lens centrally and axially in said member whereby stresses and strains developed in the member due to expansion and contraction remain substantially untransmitted to said lens and whereby the lens is substantially unrestrained from expanding and contracting relative to said member.

3. In a mounting for a lens of plastic, a tubular housing of a material having a coefficient of thermal expansion substantially different from that of said lens, means for isolating said lens from said housing whereby effects of temperature changes on the housing will be negligibly transmitted to the lens comprising a lens-carrying sleeve of a plastic having a coefficient of thermal expansion of the same order as said lens, means engaging only the end portions of said sleeve for securing the latter axially and transversely in said housing, the main peripheral area of said sleeve being free of said housing, and means for fixing said lens radially and axially in said sleeve without imposing any appreciable restraint on the axial expansion and contraction of said lens relative to said sleeve.

4. In a mounting for a lens of plastic, a sleeve of plastic having a coefficient of thermal expansion of the same order as said lens, means engaged with the sleeve and the lens at intervals around the periphery of the lens for fixing said lens in said sleeve, a housing, and means for securing said sleeve axially and transversely in said housing, said last-named means comprising means in engagement with the inner periphery of said housing and resilient extensions of said sleeve supporting said last-named means.

5. In a mounting for a lens of plastic, a sleeve of plastic having a coefficient of thermal expansion of the same order as said lens, means for fixing said lens in said sleeve, a housing, and means for securing said sleeve axially and transversely of the housing comprising means engaging only the ends of said sleeve, each end of said sleeve having a plurality of elements thereon contacting the inner periphery of said housing, a part of said sleeve extending from each end thereof towards the center of the sleeve being resilient with respect to the remainder of the sleeve.

6. In a mounting for a lens of plastic, a tubular housing of a material having a coefficient of thermal expansion substantially different from that of said lens, a tubular member of a plastic having a coefficient of thermal expansion of the same order as said lens, said member comprising a substantially rigid central portion having an outer diameter substantially smaller than the inner diameter of said housing, a pair of end portions of decreased thickness integrally connected to said central portion and a plurality of radially extending members secured to the outer end of each said end portion for mounting said member centrally in said housing, means for fixing said member axially relative to said housing, and means for mounting said lens in said rigid portion of the tubular member.

7. In a mounting for a lens of plastic, a tubular housing of a material having a coefficient of thermal expansion substantially different from that of said lens, a tubular member of a plastic having a coefficient of thermal expansion of the same order as said lens, said member comprising a substantially rigid central portion having an outer diameter substantially smaller than the inner diameter of said housing, a pair of end portions of decreased thickness integrally connected to said central portion and a plurality of radially extending members secured to the outer end of each said end portion for mounting said member centrally in said housing, means for fixing said member axially relative to said housing, said last-named means including a resilient member in engagement with one end of said tubular member to permit limited axial expansion of the latter relative to said housing, and means for mounting said lens in said rigid portion of said tubular member.

8. In a mounting for a lens of plastic, a housing, a tubular member of plastic having a coefficient of thermal expansion of the same order as said lens, said member having inclined end surfaces and axial slots in the end portions thereof to render said end portions radially contractible, means in contact with said end surfaces for fixing said member centrally and axially in said housing, said member being otherwise free of said housing, and means for mounting said lens in said member.

9. In a mounting for a lens of plastic, a housing, a tubular member of plastic having a coefficient of thermal expansion of the same order as said lens, said member having inclined end surfaces and radially contractible end portions, means in contact with said end surfaces for fixing said member centrally and axially in said housing whereby said member remains centered in said housing during expansion thereof relative to said housing, said member being otherwise free of said housing, and means for mounting said lens in said member.

10. In a mounting for a lens, a housing of a material having a coefficient of thermal expansion substantially different from that of said lens, a sleeve member of a material having a coefficient of thermal expansion of the same order as said lens, means engaging only the end portions of said sleeve for securing the latter axially and transversely in said housing, said sleeve member being otherwise free of said housing and adapted to expand relative thereto, and means approximating a multi-point, co-planar support arranged around the periphery of the lens for securing said lens in said sleeve member.

11. In a mounting for a lens, a housing of a material having a coefficient of thermal expansion substantially different from that of said lens, a sleeve member of a material having a coefficient of thermal expansion of the same order as said lens, means engaging only the end portions of said sleeve for securing the latter axially and transversely in said housing, said sleeve member being otherwise free of said housing, and adapted to expand relative thereto, and means for bonding said lens to said sleeve member at a plurality of points around the periphery of the lens.

12. In a mounting for a lens, a housing of a material having a coefficient of thermal expansion substantially different from that of said lens, a sleeve member of a material having a coefficient of thermal expansion of the same order as said lens, means engaging only the end portions of said sleeve for securing the latter axially and transversely in said housing, said sleeve member being otherwise free of said housing and adapted to expand relative thereto, and means comprising a plurality of pins carried by said sleeve and located opposite the periphery of the lens for securing said lens in said sleeve.

13. In apparatus of the character described, a tubular metallic housing, a resinous sleeve mounted in said housing, means engaging only the ends of said sleeve for fixing the axial and central position thereof relative to said housing, said sleeve being otherwise free of said housing, and means for mounting a resinous lens element in said sleeve, said last-named means comprising a plurality of radial elements carried by said sleeve to slidably extend into a plurality of recesses in the lens, said elements being disposed in a transverse plane and being spaced at equal distances around the periphery of said sleeve.

14. In apparatus for mounting a resinous lens element, in combination, a sleeve having a coefficient of thermal expansion substantially equal to that of said lens element, the latter being concentrically mounted in said sleeve in engagement with the inner wall thereof, means comprising a plurality of radially extending elements for fixing the axial position of said lens, each of said elements extending into a recess provided therefor in the periphery of said lens, and means for rigidly fixing the axial position of said sleeve and offering only frictional resistance to the radial expansion thereof.

MURRY N. FAIRBANK.

REFERENCES CITED

The following references are of record in the file of this patent:

UNITED STATES PATENTS

| Number | Name | Date |
|---|---|---|
| 1,325,936 | Fouasse | Dec. 23, 1919 |
| 2,314,838 | Kingston | Mar. 23, 1943 |
| 1,307,205 | Mihalyi | June 17, 1919 |
| 1,067,512 | Eppenstein | July 15, 1913 |
| 2,240,827 | Bangert et al. | May 6, 1941 |
| 2,203,660 | Young | June 4, 1940 |
| 707,856 | Marindin | Aug. 26, 1902 |
| 2,245,257 | Crumrine | June 10, 1941 |
| 1,980,483 | Hill et al. | Nov. 13, 1934 |
| 2,193,742 | Rohm et al. | Mar. 12, 1940 |
| 2,057,673 | Fields | Oct. 20, 1936 |
| 1,280,045 | Kuehn | Sept. 24, 1918 |
| 1,415,511 | Bausch | May 9, 1922 |
| 1,483,745 | Propson | Feb. 12, 1924 |
| 1,057,262 | Oldfield | Mar. 25, 1913 |

FOREIGN PATENTS

| Number | Country | Date |
|---|---|---|
| 490,381 | Great Britain | Aug. 15, 1938 |

Certificate of Correction

Patent No. 2,423,491 July 8, 1947

MURRY N. FAIRBANK

It is hereby certified that errors appear in the printed specification of the above numbered patent requiring correction as follows:

Column 1, line 18, before the word "means" insert *novel*; column 8, line 47, for "sleeves" read *sleeve*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*